Figure 1:
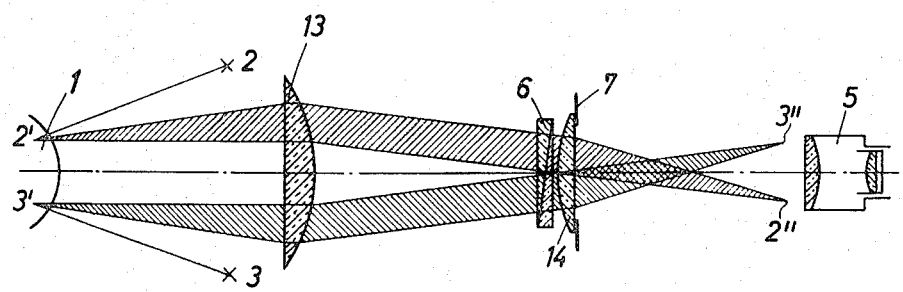

Feb. 7, 1956     H. LITTMANN ET AL     2,733,634
OPTHALMOMETER

Filed Nov. 28, 1950     2 Sheets-Sheet 1

United States Patent Office 2,733,634
Patented Feb. 7, 1956

2,733,634

OPHTHALMOMETER

Hans Littmann and Hermann Slevogt, Heidenheim (Brenz), Germany, assignors to Carl Zeiss, Heidenheim (Brenz), Germany Application November 28, 1950, Serial No. 197,865
In Germany November 14, 1949

Public Law 619, August 23, 1954
Patent expires November 14, 1969

2 Claims. (Cl. 88—20)

The present invention concerns an instrument for measuring the curvature of the cornea, i. e. and ophthalmometer, with which the mutual distance of the two virtual images of two test marks produced by the outer surface of the cornea is measured by means of a microscope and a device for producing a double image of each of the test mark images reflected by the cornea and for adjusting these two double images relatively to each other for coincidence. If the mutual distance of the test marks and their distance from the cornea is known the curvature of the cornea can be ascertained from the distance apart of the virtual images.

With the customary ophthalmometers in oculist's practice the two test marks are fitted usually at either side of the microscope on a rod lying perpendicular to the optical axis of the microscope or on a segment of a circular body lying accordingly. For measuring the mutual distance of the images use is made thereby in general of rotatable wedges, Wallaston prisms or tiltable plano-parallel plates, by which means the virtual images are doubled and may be brought into coincidence by a suitable choice of the deflection caused by said means. The displacement of the deflecting elements or, in case the mutual distance of the virtual images shall be invariable, the displacement of the test marks serves for measuring the curvature of the cornea. These known ophthalmometers have the disadvantage that the measuring results obtained thereby depend on the distance between the instrument and the eye to be examined. The mutual distance of the two virtual images e. g. becomes too small in case the distance between the test marks and the eye is too great. At the same time, however, the observation is made with too great a distance, the angle to be compensated by the coincidence arrangement thereby being further diminished. Hence, the known ophthalmometers must be located very exactly to a definite distance, which adjustment in many cases may not be easily achieved by the oculist.

According to the invention the measuring result is made independent of the mutual distance of the test marks by interposing collimators fitted to the microscope and directed to the eye and inclined to each other by an unvariable angle, between the marks and the eye to be examined by which collimators the test marks are optically shifted to an infinitely great distance and, for achieving coincidence of the virtual images produced by the cornea by providing an arrangement causing a deflection which depends only on the linear mutual distance of these two virtual images. This is affected by locating an image doubling coincidence in a telecentric path of imaging rays of a microscope objective lens system. With this construction it is possible that an alteration of the distance between the patient's eye and the test marks within certain finite limits does not influence the measuring result of the mutual distance of the two virtual images because the test marks by the action of the collimators are shifted to an infinite distance. Likewise, on measuring the mutual distance of the virtual images, the distance of the instrument does not play part as the result obtained by the location of the coincidence arrangement does not depend on the angle at which the virtual images are seen with the instrument, but depend solely on the linear mutual distance of such images.

It is well known optically to shift the test marks to infinity by means of collimators, in an ophthalmometer instrument, however, the coincidence arrangement in these well known instruments was not independent from the distance and the advantage to be achieved by the collimators could be reached only imperfectly. On the door hand another well known instrument uses a coincidence system which is independent of influences due to alterations in distance between the instrument and the cornea, by using tiltable plane parallel plates (Helmholtz), but the mires were not fitted to the instrument housing so that for such mires the problem of an alteration of the mutual distance of the images of the mires by the cornea with the operating instrument distance does not exist. But a location of mires separate from the instrument is uncomfortable.

The independency of the measuring result is achieved in an especially suitable manner by placing the coincidence arrangement in a telecentric path of imaging rays exactly into the rear focal plane of the microscope. The entrance pupil of the objective is then lying in the infinity thereby resulting a telecentric path of rays for imaging the said virtual images in the microscope. The principal rays running in parallel to the optic axis emanating from the virtual images intersect, therefore, the axis of the microscope at the place of the aperture diaphragm at an angle to be compensated by the coincidence arrangement depending solely from the distance of the principal ray in question from the optical axis, i. e. depending on the linear mutual distance of the virtual images of the test marks. This distance, however, is independent of the distance between the two virtual images and the microscope and remains unaltered, thus constituting a measure of the mutual distance of the virtual images within wide limits.

As a coincidence arrangement there may used, as is known, prism systems rotatable relatively to each other. Each such system consists of a circular prismatic disc surrounded by a concentric ring of opposite prismatic effect.

In a preferred embodiment of an instrument according to the invention, the microscope objective is built up of two components the rear component of which being located approximately in the focal plane of the front component. The operating distance between the patient's eye and the microscope can suitably be chosen approximately equal to the focal length of the front component, so that there exist at least approximately parallel paths of imaging rays for each mire image between the two members of the objective also because of the relatively small mutual distance of the virtual images of the mires. The rotatable wedges are located in the rear focal plane of the front component in immediate proximity of the rear member of the objective, for avoiding as far as possible any defects resulting in the images by the action of the wedges.

Figure 2:
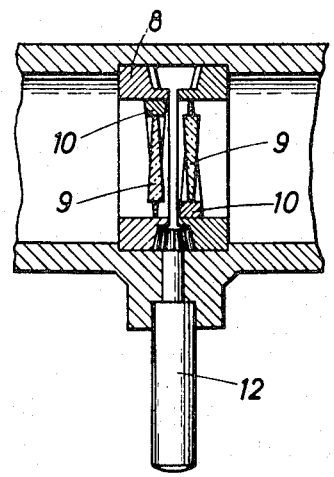
Figure 3:
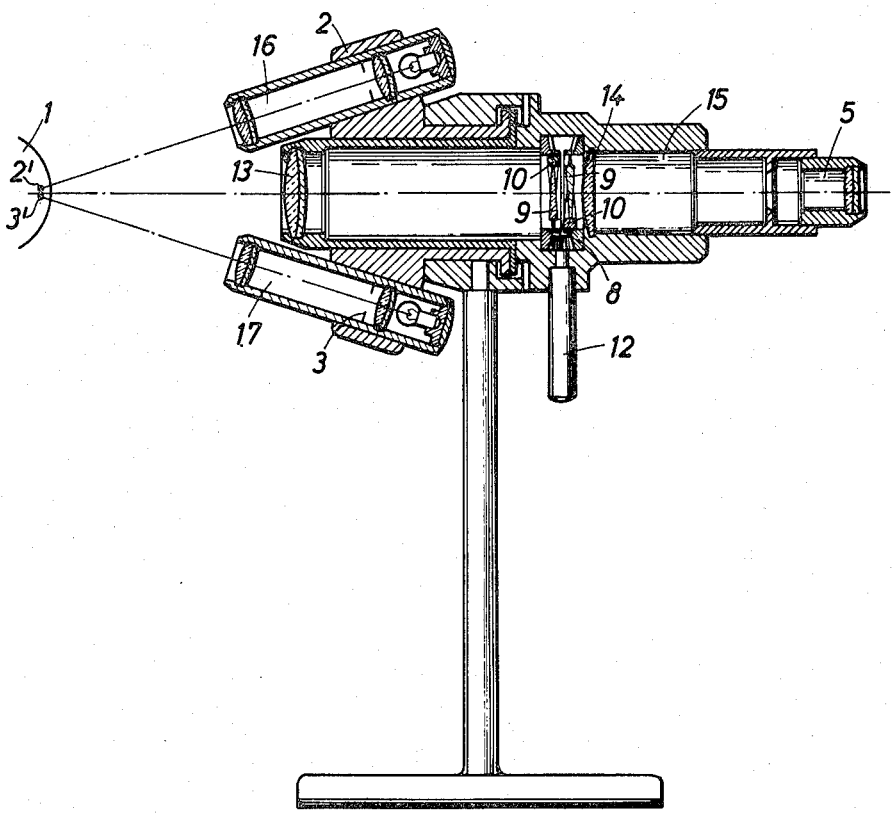

In the drawing Fig. 1 shows schematically an instrument having a microscope objective consisting of two lens components. Fig. 2 shows a constructional form of a coincidence arrangement comprising rotatable wedges. In Fig. 3 a constructional example is shown in a section, according to Fig. 2.

In Fig. 1 the patient's eye is designated by 1, the curvature of the cornea of which is to be measured. For this purpose two luminous test marks 2 and 3 are provided, virtual images 2' and 3' of which are produced by the cornea of 1. The mutual distance of the images 2' and 3' is, with known distance of the test marks 2 and 3 from each other and from the eye, a measure of the curvature of the cornea. The distance apart of the images 2' and 3' is measured by means of a microscope comprising an objective consisting of a front component 13 and a rear component 14, and an ocular 5. In the rear focal plane of the front component 13 there is located a coincidence arrangement 6 of rotatable wedges for the coincidence measurement and in close proximity thereto the said rear component and an aperture diaphragm 7. Because of this location of the diaphragm 7 the path of the rays forming images 2" and 3" of the virtual images 2' and 3' in the image plane of the microscope is telecentric. In the drawing two partial ray pencils pertaining to the images 2" and 3", respectively, are indicated by hatching, each of which pencils being bounded by its principal ray traversing diaphragm 7 in its centre and by a ray striking the edge of diaphragm 7. Obviously, the angle about which the principal rays intersect the optical axis at the place of the aperture diaphragm 7, i. e. at the rear focal point of the front component 13, is independent from the distance between the virtual images 2' and 3' of the test marks and the objective component 13. This angle is dependent solely from the mutual distance of the images 2' and 3' and is, therefore, a measure of this distance; this angle is compensated by adjusting the images 2" and 3" to coincidence. The coincidence arrangement may consist, as shown in Fig. 3, of a system of rotatable wedges, each part of which system is composed of a circular prismatic disc 9 surrounded by a concentric ring 10 of opposite effect. The two systems are arranged within a mount 8 and may be rotated oppositely to each other by a handle 12. The aperture is divided by the wedge system into two parts, whereby the images 2" and 3" are doubled and displaced relatively to each other. The displacement is to be adjusted in such a manner that e. g. the left-hand half-image 2" coincides with the right-hand half-image 3".

The ophthalmometer shown in Fig. 3 consists of a microscope 15 at which two collimators 16 and 17 are fitted rotatable about the axis of the microscope, thus allowing to examine the patient's eye 1 in any meridional plane. The microscope and the collimators contain the elements described in connection with Figs. 1, 2 and 3. At the place of the aperture diaphragm 14 the ray pencils are divided either geometrically (as e. g. shown in Fig. 3) or physically (e. g. by means of any prism system known for this purpose).

We claim:

1. An instrument for measuring the curvature of the cornea comprising in a housing a microscope with an objective lens system and axially aligned therewith an eyepiece and an aperture diaphragm, said objective lens system comprising a front component and a rear component, two collimator lens systems fitted symmetrically to said housing each with its optical axis inclined at a fixed angle to the optical axis of said microscope lens system, all said optical axes lying in one plane, two mires each associated with and arranged in the focal plane of one of said collimator lens systems for optically shifting the said mires to an infinitely great distance, an image doubling coincidence system located exactly in the rear focal plane of said front lens component of said microscope lens system in a telecentric path of imaging rays, said rear lens component and said diaphragm located in close proximity to said image doubling coincidence system, and means for adjusting said image doubling coincidence system for displacement of the images of said mires formed by the cornea relative to each other.

2. An instrument according to claim 1 with said image doubling coincidence system comprising at least a rotatable wedge system composed of two parts each consisting of a circular prismatic disc and a prismatic ring of opposite prismatic deviating effect surrounding said disc and fixed thereto, said two parts being arranged within a mount and adapted to be commonly rotatable to equal amounts in opposite direction about their central optical axis.

References Cited in the file of this patent

UNITED STATES PATENTS

| 624,106 | Satterlee | May 2, 1899 |
| 631,307 | Inskeep et al. | Aug. 22, 1899 |
| 1,468,797 | Brierton et al. | Sept. 25, 1923 |
| 1,918,540 | Hartinger | July 18, 1933 |
| 2,171,627 | Hartinger | Sept. 5, 1939 |